United States Patent
Shiobara et al.

(10) Patent No.: US 8,412,013 B2
(45) Date of Patent: Apr. 2, 2013

(54) OPTICAL FIBER CABLE AND LAYING METHOD THEREOF

(75) Inventors: Satoru Shiobara, Yachiyo (JP); Shimei Tanaka, Chiba (JP); Tadayoshi Sayama, Yotsukaido (JP); Daiki Takeda, Yotsukaido (JP); Masashi Ohno, Sakura (JP); Naoki Okada, Yotsukaido (JP); Keiichiro Sugimoto, Tsukuba (JP); Shinichi Niwa, Tsukuba (JP)

(73) Assignees: Fujikura Ltd., Tokyo (JP); Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 13/192,269

(22) Filed: Jul. 27, 2011

(65) Prior Publication Data

US 2012/0020632 A1    Jan. 26, 2012

Related U.S. Application Data

(63) Continuation of application No. PCT/JP2010/050962, filed on Jan. 26, 2010.

(30) Foreign Application Priority Data

Jan. 28, 2009  (JP) .................. P2009-016628

(51) Int. Cl.
*G02B 6/44* (2006.01)

(52) U.S. Cl. ........ 385/105; 385/100; 385/102; 385/106; 385/107

(58) Field of Classification Search .......... 385/102, 385/105; 254/134.3 R, 134.3 FT
See application file for complete search history.

(56) References Cited

U.S. PATENT DOCUMENTS

| | | | |
|---|---|---|---|
| 6,993,237 B2 * | 1/2006 | Cooke et al. | 385/135 |
| 2005/0238300 A1* | 10/2005 | Jamet et al. | 385/100 |
| 2007/0140631 A1* | 6/2007 | Pizzorno et al. | 385/112 |
| 2009/0034922 A1* | 2/2009 | Yasutomi et al. | 385/113 |

FOREIGN PATENT DOCUMENTS

| | | |
|---|---|---|
| JP | 11-41739 A | 2/1999 |
| JP | 2001-35265 A | 2/2001 |
| JP | 2004-198588 A | 7/2004 |
| JP | 2006-163209 A | 6/2006 |
| JP | 2006-180637 A | 7/2006 |
| JP | 2007-183477 A | 7/2007 |
| JP | 2008-129062 A | 6/2008 |

OTHER PUBLICATIONS

Matsumoto et al. "Develoment of Cicada Proof Drop Cable with Low Friction Jacket." IEICE Technical Report, OFT 2007-48-61 Hikari Fiber Oyo Gijutsu, vol. 107, No. 451, Jan. 17, 2008, pp. 19-23.
Japanese Office Action for Japanese Patent Application No. 2009-016628 dated Nov. 27, 2012.
"Start of Delivery of Thin and Low-Friction Indoor Optical Cable", Fujikura News No. 331, Feb. 2009.
Chinese Office Action for Chinese Patent Application No. 20108005935.9 dated Dec. 24, 2012.

* cited by examiner

*Primary Examiner* — Ryan Lepisto
(74) *Attorney, Agent, or Firm* — Sughrue Mion, PLLC

(57) ABSTRACT

An optical fiber cable includes an elongated optical element portion having an optical fiber, a pair of tensile strength members and an outer jacket. The optical fiber is composed of one or more plastic coated optical fibers, tight-buffered optical fibers or optical ribbon fibers. The pair of tensile strength members is arranged in parallel at both sides of the optical fiber in a width direction of the optical fiber. The outer jacket covers outer circumferences of the optical fiber and the pair of tensile strength members. A frictional coefficient of the outer jacket is equal to or less than 0.20. Shore D hardness of the outer jacket is equal to or more than 60.

6 Claims, 3 Drawing Sheets

OPTICAL FIBER CABLE AND LAYING METHOD THEREOF

CROSS REFERENCE TO RELATED APPLICATION

This is a continuation application based on PCT application No. PCT/JP2010/050962 filed Jan. 26, 2010, which claims priority to JP 2009-016628 filed Jan. 28, 2009, the contents of which are incorporated herein by reference.

TECHNICAL FIELD

The present invention relates to an optical fiber cable and a laying method thereof for inserting a new optical fiber cable into an electric conduit where an electric cable or the like has been already arranged and laid.

BACKGROUND ART

Conventionally, in order to enable a high-speed data communication via FTTH (Fiber to the Home), that is in order to send/receive information to/from a home or office with a high-speed wide band, an optical fiber composed of a plastic coated optical fiber, a tight-buffered optical fiber or an optical ribbon fiber is drawn into a subscriber home such as a building or conventional home, from an optical fiber cable for access extended from a telephone exchange. An optical fiber cable for drop is employed to distribute an optical fiber. The optical fiber cable for drop is employed when an optical fiber is drawn into a home or office from a branch closure of a trunk cable supported by a telephone pole or when an optical fiber is drawn into each room within the home or office. As the optical fiber cable for drop, an optical fiber drop cable (drop wire), a little core optical aerial cable and an indoor drop cable are mainly cited. The little core optical aerial cable is an optical fiber cable for drop of which a size of support wire is increased to be applied to a longer laying span length. The indoor drop cable is an optical fiber cable for drop to be employed when an optical fiber is drawn into each room within a home or office.

As shown in FIG. 1, a conventional indoor drop cable 101 includes an elongated optical element portion 115. The optical element portion 115 is composed of an optical fiber 103, at least a pair of tensile strength members 105 and 105, an outer jacket 107, and notches 113 and 113. The optical fiber 103 is composed of a plastic coated optical fiber, a tight-buffered optical fiber or an optical ribbon fiber. The tensile strength members 105 and 105 are arranged in parallel at both sides of the optical fiber 103 in a width direction of the optical fiber 103. The outer jacket 107 is made up of a resin, covers outer circumferences of the optical fiber 103 and the tensile strength members 105 and 105, and has a rectangular cross-sectional shape. The outer jacket 107 has a long side arranged in the width direction of the optical fiber 103 and a short side arranged in a thickness direction of the optical fiber perpendicular to the width direction. Viewed from the cross-sectional surface of the outer jacket 107, the notches 113 and 113 are formed on a surface of the outer jacket 107 such that they lie at both sides of the optical fiber 103 on a Y-axis 111 which passes the center of the optical fiber 103 and is perpendicular to an X-axis 109 connecting the centers of the optical fiber 103 and the tensile strength members 105 and 105.

Generally, the tensile strength member is a steel wire having a diameter of 0.4 mm. As an outer jacket material of the outer jacket 109, a compound of a non halogen fire-retardant such as magnesium hydroxide or aluminum hydroxide and a based polymer such as ethylene-vinyl acetate copolymer (EVA resin) or ethylene-ethyl acrylate (EEA) has been employed. The outer jacket has an outer diameter composed of a short side of about 2.0 mm and a long side of about 3.0 mm.

In order to efficiently insert an optical fiber cable into a pipe such as an electric conduit where an electric cable or the like has been already laid, there is devisal to define the bending rigidity of optical fiber cable to increase insertability of the optical fiber cable into the pipe.

For example, a patent document 1 discloses an optical fiber for air pressure feed of which the bending rigidity is defined within a range of 300 N·mm$^2$ to 400 N·mm$^2$. A patent document 2 discloses an optical fiber cable having a function similar to an insert tool, of which the bending rigidity is defined within a range of 0.06 N·m$^2$ to 0.12 N·m$^2$. A patent document 3 discloses an optical fiber drop cable of which the bending rigidity is defined within a range of 80 N·mm$^2$ to 500 N·mm$^2$.

CITATION LIST

Patent Literature

Patent document 1: Japanese Patent No. 3077729
Patent document 2: Japanese Patent Laid-open Publication No. 2006-163209
Patent document 3: Japanese Patent Laid-open Publication No. 2003-90942

SUMMARY OF INVENTION

Technical Problem

Generally, the optical fiber cable 101 has an exposed wiring configuration where a staple for optical fiber cable is employed within a room or a covered wiring configuration where a wire protector is covered. In order to insert and lay a new optical fiber cable 101 into an electric conduit such as a synthetic resin flexible conduit, it is necessary to push-insert an insert rod (insert tool) and draw the new optical fiber cable 101 using the insert tool in the electric conduit. In a case where there are many curved portions in the electric conduit, it is necessary to draw an optical fiber cable 101 in the electric conduit after applying an insert lubricant agent to the optical fiber cable 101 because a material of an outer jacket 107 of the optical fiber cable 101 has a high friction coefficient. Also, there is a problem that scuff easily occurs on the outer jacket due to friction against the electric conduit because the material of the outer jacket 107 is flexible.

In contrast, in a multi-family apartment building such as an apartment building, an optical fiber 101 is laid from MDF (Main Distribution Frame) to each house. It is desirable to receive a wiring of this portion in a pipe such as an electric conduit from the standpoint of safety and reliability of line.

In a recent newly built apartment, there are many cases where a pipe for laying an optical fiber cable is installed at a time of building an apartment. However, in a multi-family apartment building such as an apartment building having been built, there are many cases where an electric conduit where an optical fiber cable 101 is to be newly laid therein is not installed. In order to construct an optical fiber network to each house within the apartment building, it is necessary to install a new electric conduit. This brings a problem that a cost increases.

Also, it is considered to lay a thin optical fiber cable 101 in space within an electric conduit in an apartment where a metal telephone line has been laid. However, when an additional optical fiber cable 101 is laid in the electric conduit, there are many problems on drawing work as described above. In addition, it is difficult to insert a new optical fiber 101 in an electric conduit having been installed because it is difficult to insert the insert rod due to a metal telephone line having been laid in the electric conduit. In a case where the number of curved portions of an electric conduit is large, there is a problem that the insert rod is not push-inserted or it takes a lot of trouble to push-insert the insert rod.

In a case where an optical fiber cable 101 has an outer diameter composed of a short side of about 2.0 mm and a long side of about 3.0 mm, since the outer diameter of the optical fiber cable 101 is large, the number of optical fiber cables 101 to be laid in an electric conduit becomes to be small. It is not suitable to lay a plurality of optical fiber cables 101 in the electric conduit.

The optical fiber cable disclosed in the patent document 1 is not inserted in an electric conduit without pressure-feeding using air because a bending rigidity necessary to push-insert a unit of the optical fiber cable alone is insufficient.

Since the optical fiber cable disclosed in the patent document 2 has a too high bending rigidity, it is difficult to wind the optical fiber cable to have a small diameter and receive it in a cabinet, a closure or the like. Also, since the optical fiber cable disclosed in the patent document 2 is an optical fiber cable having a circular cross-section, insertability is not analyzed under a condition where a bending rigidity in a long side direction and a bending rigidity in a short side direction of an optical fiber cable having a rectangular cross-section differ from each other.

Since the optical fiber cable disclosed in the patent document 3 has a low bending rigidity, it is easy to wind the optical fiber cable to have a small diameter and receive it in a cabinet, a closure or the like. However, it is difficult to push-insert it in an electric conduit.

The present invention has an object to provide an optical fiber cable and a laying method thereof for easily and efficiently inserting a new optical fiber cable into an electric conduit where an electric cable or the like has been already arranged and laid without using a insert tool.

Solution to Problem

In order to achieve the above object, the present invention provides an optical fiber cable comprising: an elongated optical element portion comprising: an optical fiber including one or more plastic coated optical fibers, tight-buffered optical fibers or optical ribbon fibers; at least a pair of tensile strength members arranged in parallel at both sides of the optical fiber in a width direction of the optical fiber; and an outer jacket covering outer circumferences of the optical fiber and the pair of tensile strength members, and having a rectangular cross-sectional surface in which a long side is arranged in the width direction of the optical fiber and a short side is arranged in a thickness direction perpendicular to the width direction of the optical fiber, wherein a frictional coefficient of the outer jacket is equal to or less than 0.20 and Shore D hardness of the outer jacket is equal to or more than 60.

For the optical fiber cable of the present invention, it is preferable that a bending rigidity in a short side direction of the outer jacket is equal to or more than $1.3 \times 10^{-3}$ N·m².

For the optical fiber cable of the present invention, it is preferable that the bending rigidity in the short side direction of the outer jacket is within a range of $1.5 \times 10^{-3}$ N·m² to $5.0 \times 10^{-3}$ N·m².

The present invention provides a laying method of optical fiber cable comprising: push-inserting an optical fiber cable into an electric conduit, wherein the optical fiber cable includes an elongated optical element portion, the elongated optical element portion includes: an optical fiber including one or more plastic coated optical fibers, tight-buffered optical fibers or optical ribbon fibers; at least a pair of tensile strength members arranged in parallel at both sides of the optical fiber in a width direction of the optical fiber; and an outer jacket covering outer circumferences of the optical fiber and the pair of tensile strength members, and having a rectangular cross-sectional surface in which a long side is arranged in the width direction of the optical fiber and a short side is arranged in a thickness direction perpendicular to the width direction of the optical fiber, a frictional coefficient of the outer jacket is equal to or less than 0.20, and Shore D hardness of the outer jacket is equal to or more than 60.

It is preferable that the laying method of optical fiber cable of the present invention further comprises inserting the optical fiber cable into the electric conduit in a state where a distal end portion of the optical fiber cable is bent.

It is preferable that the laying method of optical fiber cable of the present invention further comprises bundling the optical fiber cable of which the distal end portion is bent and another optical fiber cable using a fixing member, and inserting at least two optical fiber cables into the electric conduit.

It is preferable that the laying method of optical fiber cable of the present invention further comprises winding a plurality of optical fiber cables on a reel together previously, and inserting the plurality of optical fiber cables into the electric conduit at onetime.

For the laying method of optical fiber cable of the present invention, it is preferable that a bending rigidity in a short side direction of the outer jacket of the optical fiber cable is equal to or more than $1.3 \times 10^{-3}$ N·m².

For the laying method of optical fiber cable of the present invention, it is preferable that the bending rigidity in the short side direction of the outer jacket of the optical fiber cable is within a range of $1.5 \times 10^{-3}$ N·m² to $5.0 \times 10^{-3}$ N·m².

Advantageous Effects of Invention

According to the optical fiber cable and the laying method thereof in the present invention, the outer jacket has a friction coefficient equal to or less than 0.2 and Shore D hardness equal to or more than 60, which increases insertability into an electric conduit to allow it to be inserted in an electric conduit having plural curved portions without using a lubricant agent for insert. Also, according to the optical fiber cable and the laying method thereof in the present invention, a new optical fiber cable with rigidity can be directly push-inserted in limited space within an electric conduit in which wires and the like have been already laid and arranged, without using an insert tool. This can easily and efficiently insert the optical fiber cable in the electric conduit. Further, this can surely reduce a possibility that it provides roll or scuff on an optical fiber cable having been already laid.

DESCRIPTION OF EMBODIMENTS

An exemplary embodiment of the present invention will be described below with reference to FIGS. 2 to 6.

Figure 1:
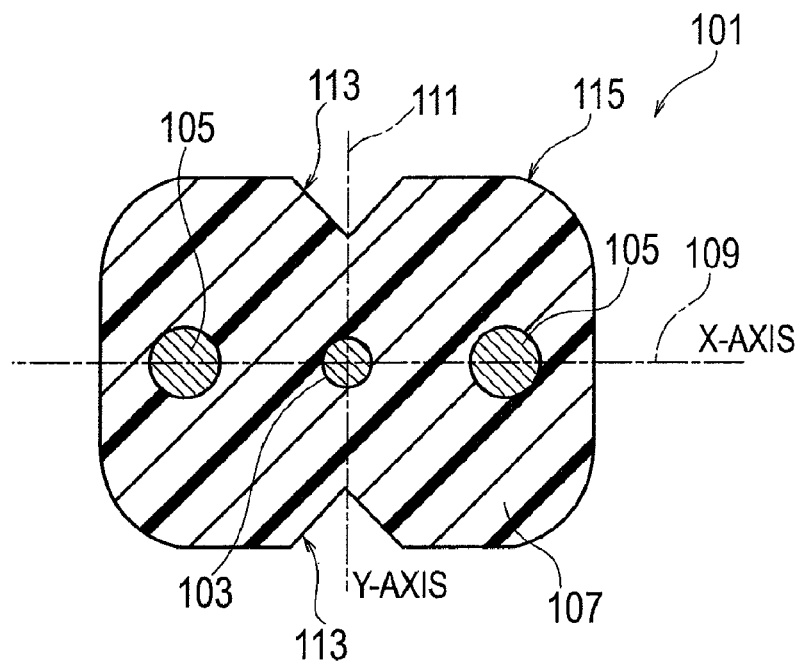
FIG. 1 It is a cross-sectional diagram of a conventional optical fiber cable.
Figure 2:
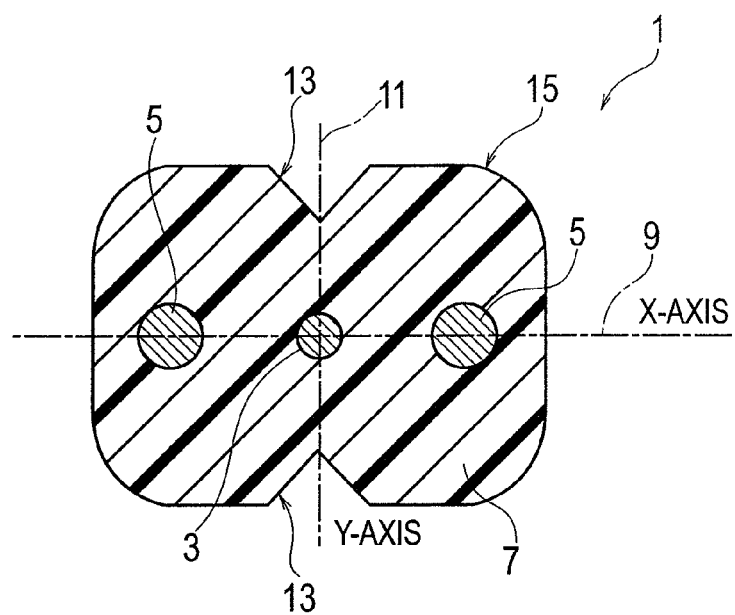
FIG. 2 It is a cross-sectional diagram of an optical fiber cable according to an exemplary embodiment of the present invention.

In the present embodiment, as shown in FIG. 2, an optical fiber indoor cable is cited as an example of an optical fiber cable according to the present invention. An optical fiber cable 1 includes an elongated optical element portion 15. The optical element portion 15 is composed of an optical fiber 3, at least a pair of tensile strength members 5 and 5, an outer jacket 7, and notches 13 and 13. The optical fiber 3 is composed of one or more plastic coated optical fibers, tight-buffered optical fibers or optical ribbon fibers. In a case where the optical fiber 3 is composed of two or more plastic coated optical fibers, tight-buffered optical fibers or optical ribbon fibers, these plastic coated optical fibers, tight-buffered optical fibers or optical ribbon fibers are arranged in parallel with each other and laid in the optical element portion 15. The tensile strength members 5 and 5 are arranged in parallel at both sides of the optical fiber 3 in a width direction of the optical fiber 3. The outer jacket 7 is made up of a resin, covers outer circumferences of the optical fiber 3 and the tensile strength members 5 and 5, and has a rectangular cross-sectional shape. The outer jacket 7 has a long side arranged in the width direction of the optical fiber 3 and a short side arranged in a thickness direction of the optical fiber 3 perpendicular to the width direction. Viewed from the cross-sectional surface of the outer jacket 7, the notches 13 and 13 are formed on a surface of the outer jacket 7 such that they lie at both sides of the optical fiber 3 on a Y-axis 11 which passes the center of the optical fiber 3 and is perpendicular to an X-axis 9 connecting the centers of the optical fiber 3 and the tensile strength members 5 and 5. The outer jacket 7 has a friction coefficient equal to or less than 0.20 and Shore D hardness equal to or more than 60.

The optical fiber cable 1 has an overall size thinned and the outer jacket 7 with a high hardness property and a low frictional property, and increases a bending rigidity in the short side direction of the cable due to a material of the outer jacket 7 and the tensile strength members 5 and 5. This configuration allows the optical fiber cable 1 to be inserted in an electric conduit (not shown) without using an insert tool such as an insert rod.

Therefore, this can reduce an man-hour of inserting work, effectively use space in an electric conduit having been installed where a metal telephone line has been laid, and effectively and economically construct an optical fiber network in an apartment building having been built.

Next, an example of the optical fiber cable 1 will be described.

In the present example, insertability of the optical fiber cable 1 is verified using a pipe model which has an overall length of 20 m and five curved portions each bending at right angle. A reason for using this pipe model is as follows. "FTTH construction technique to sustain the age of optical communication" issued from OPTRONICS Co., Ltd. describes "it is desirable that the number of curved portions between insert points in an electric conduit each bending at right angle is equal to or less than two". However, since there are not any clear guidelines and it is considered that an apartment building having been built has many electric conduits each having three or more curved portions each bending at right angle, this pipe model is used.

A CD pipe (pipe equipment) having an inner diameter of 22 mm is employed as an electric conduit. Thirty pairs of metal telephone lines having an outer diameter of about 9 mm is employed as a metal cable having been installed. The metal telephone lines are previously inserted in the electric conduit. Thus, it is assumed that the optical fiber cable 1 is newly drawn into thirty houses where the metal telephone lines have been drawn via the electric conduit. Then, thirty optical fiber cables 1 are drawn into the electric conduit where the metal telephone lines are previously inserted.

In order to effectively use space in the electric conduit, it is desirable that an outer diameter of optical fiber cable 1 is set as small as possible. However, given workability of terminal leading of cable portion, there is a problem that if the outer diameter of optical fiber cable 1 is too thin, workability becomes worse.

In this pipe model, in a case where a standard and commercially available insert rod having a distal end with a diameter of 9 mm is employed, if a cross-sectional area of optical fiber cable 1 is set within a range of 2.0 mm$^2$ to 4.0 mm$^2$, a cable size in which workability of terminal leading and insertability are good can be obtained.

If the cross-sectional area of optical fiber cable 1 is less than 2.0 mm$^2$, the workability of terminal leading becomes harder because the optical fiber cable 1 is too thin. If the cross-sectional area of optical fiber cable 1 is more than 4.0 mm$^2$, the insertability becomes much harder because space occupancy of the thirty optical fiber cables 1 and the insert rod with respect to the cross-sectional area of electric conduit exceeds 60%.

The outer jacket 7 of the optical fiber cable 1 is composed of a fire-retarding, high-hardness and low-frictional material having Shore D hardness equal to or more than 60 and a friction coefficient equal to or less than 0.20. The tensile strength members 5 and 5 are composed of steel wires each having a diameter of 0.5 mm. The outer jacket 7 has an outer diameter composed of a short side of about 1.6 mm and a long side of about 2.0 mm. The outer jacket 7 has a bending rigidity equal to or more than $1.5 \times 10^{-3}$ N·m$^2$ against bending in a short side direction and a bending rigidity equal to or more than $10 \times 10^{-3}$ N·m$^2$ against bending in a long side direction.

The outer jacket 7 is formed by covering a resin composition including 25-90 parts by mass of inorganic phosphate and 0.75-15 parts by mass of silicone-dispersed polyethylene, or 25-90 parts by mass of inorganic phosphate and 0.75-15 parts by mass of silicone-grafted polyethylene with respect to 100 parts by mass of base resin obtained by adding to high-density polyethylene at least one resin selected from ethylene-vinyl acetate copolymer and ethylene-ethyl acrylate. When characteristics of the optical fiber cable 1 configured in this manner are checked, optical transmission loss of wavelength of 1.55 μm is equal to or less than 0.25 dB/km and a loss temperature character (−10° C. to +40° C.) has loss fluctuation equal to or less than 0.03 dB/km. The characteristics are similar to the conventional cable. By limiting the binding rigidities in the short side direction and the long side direction of the optical fiber cable 1, the insertability into an electric conduit can be harmonized with the reception into a cabinet or the like.

As a modification of the present example, polyvinyl chloride, nylon, polyester, polyacetal, polypropylene or the like may be employed as the resin having the advantage of strength of which a surface is smooth. Also, by adding aliphatic amide such as stearic acid amide to the covering resin as lubricant agent, lubricating ability of surface may be improved. Thereby, frictional resistance between a newly inserted rope and a cable having been laid and friction resistance between a newly inserted rope and a pipe conduit can be remarkably reduced.

When a lubricative resin cover is formed to obtain effect of reducing frictional resistance by adding lubricant agent to a resin cover, fatty acid amide such as stearic acid amide, oleic amide, ethylenebis amide or erucic acid amide is generally used as the lubricant agent. Especially, it is preferable to use stearic acid amide or erucic acid amide. One type of lubricant agent may be added to a resin cover, or two or more types of lubricant agents may be combined and added to a resin cover. Generally, 0.01-1 parts by mass of lubricant agent is added to 100 parts by mass of polyethylene.

As another modification of the present example, a lubricative resin cover capable of reducing friction between the resin cover and a cable having been installed or friction between the resin cover and a pipe conduit without adding lubricant agent to the resin cover may be used. As the lubricative resin cover, silicone-dispersed polyethylene, silicone-grafted polyethylene, fluorine-contained-resin-dispersed polyethylene, fluorine-contained-resin-coating polyethylene or the like is used.

For comparison, for a material of the outer jacket 7 obtained by compounding metal hydroxide such as magnesium hydroxide or aluminum hydroxide as a non halogen fire-retardant with respect to a based polymer such as ethylene-vinyl acetate copolymer (EVA resin) or ethylene-ethyl acrylate (EEA) having been generally employed in the conventional optical fiber cable 1, it is difficult to obtain low frictional property, anti-scuff property (the strength of outer jacket 7 with respect to scuff due to friction between adjacent optical fiber cables 1 and friction between each optical fiber cable 1 and an inner wall of electric conduit), and bending rigidity of cable which are necessary in a case where the optical fiber cable 1 is inserted into an electric conduit.

Next, a relationship among a friction coefficient of the outer jacket 7, hardness of the outer jacket 7 and insertability into the electric conduit in the present example will be described.

Experimental productions (1)-(4) of optical fiber cables 1 which respectively include outer jackets 7 having four frictional coefficients 0.7, 0.25, 0.18 and 0.20 are formed, and experimental tests of insertability into the electric conduit of the pipe model described above are conducted.

The experimental production (1) and the experimental production (3) of optical fiber cables 1 include the outer jackets 7 in which a non halogen fire-retardant and a low frictional addition agent are compounded to a base polymer of ethylene-vinyl acetate copolymer (EVA resin). Shore D hardness of the experimental production (1) and Shore D hardness of the experimental production (3) of optical fiber cables 1 are respectively "56" and "52".

The experimental production (2) and the experimental production (4) of optical fiber cables 1 include the outer jackets 7 in which a non halogen fire-retardant and a low frictional addition agent are compounded to a base polymer of high-density polyethylene (HDPE). Shore D hardness of the experimental production (2) and Shore D hardness of the experimental production (4) of optical fiber cables 1 are respectively "63" and "60" and harder than the experimental production (1) and the experimental production (3) of optical fiber cables 1. Working for inserting each optical fiber cable 1 into the electric conduit is carried out using the insert rod. The insertability is checked based on the number of optical fiber cables allowed to be inserted and existence or non-existence of scuff after insert. The result of experimental tests of insertability is shown in Table 1.

TABLE 1

| Experimental production | Frictional coefficient of outer jacket | Hardness of outer jacket (Shore D) | Number of optical fiber cables allowed to be inserted | Scuff after insert |
|---|---|---|---|---|
| Experimental production (1) | 0.7 | 56 | 17 | there are roll and scuff |
| Experimental production (2) | 0.25 | 63 | 25 | OK |
| Experimental production (3) | 0.18 | 52 | 30 or more | there are roll and scuff |
| Experimental production (4) | 0.20 | 60 | 30 or more | OK |

As shown in Table 1, if the frictional coefficient of outer jacket 7 is equal to or less than 0.20, thirty or more optical fiber cables 1 can be laid (see the experimental production (3) and the experimental production (4)). Also, if Shore D hardness is equal to or less than 56, roll and scuff occur on the optical fiber cables 1 after laid (see the experimental production (1) and the experimental production (3)). As a cause, there is a case where the insert rod provides a push trace on the optical fiber cable 1 having been inserted when push-inserted or a case where friction between cables provides scuff.

Therefore, in order to insert the optical fiber cables 1 in the electric conduit without providing roll and scuff on the optical fiber cables 1, it is necessary to use the optical fiber cable 1 including the outer jacket 7 in which the frictional coefficient is equal to or less than 0.20 and Shore D hardness is equal to or more than 60.

Next, a relationship among an outer diameter of cable, bending rigidity and push-insertability into the electric conduit in the present example will be described.

Experimental productions (5)-(8) of optical fiber cables 1 are formed while a value of bending rigidity in the short side direction of optical fiber cable 1 and a value of outer diameter of cable are changed, and experimental tests of push-insertability into the electric conduit of the pipe model described above are conducted. Here, the push-insertability means insertability at a time when the optical fiber cable 1 is directly push-inserted into the electric conduit without using the insert rod. It is noted that the outer jackets 7 in the experimental productions (5)-(8) of optical fiber cables 1 are composed of materials each of which a frictional coefficient is 0.20 and Shore D hardness is 60, as well as the experimental production (4) of optical fiber cable 1 shown in Table 1. The push-insertability is checked based on the number of optical fiber cables allowed to be inserted and existence or non-existence of scuff after insert. The result of experimental tests of push-insertability is shown in Table 2.

TABLE 2

| Experimental production | Outer diameter mm | Frictional coefficient of outer jacket | Hardness of outer jacket (Shore D) | Bending rigidity in short side direction N · m² | Number of optical fiber cables allowed to be inserted | Scuff after insert |
|---|---|---|---|---|---|---|
| Experimental production (5) | 1.5 × 1.9 | 0.20 | 60 | $0.7 \times 10^{-3}$ | 0 | — |
| Experimental production (6) | 1.4 × 1.9 | 0.20 | 60 | $1.3 \times 10^{-3}$ | 19 | OK |
| Experimental production (7) | 1.6 × 2.0 | 0.20 | 60 | $1.5 \times 10^{-3}$ | 30 or more | OK |
| Experimental production (8) | 1.4 × 1.9 | 0.20 | 60 | $5.0 \times 10^{-3}$ | 30 or more | OK |

As shown in Table 2, if the bending rigidity in the short side direction is equal to or more than $1.3 \times 10^{-3}$ N·m², the push-insertability is good (see the experimental productions (6)-(8)). Especially, if the bending rigidity in the short side direction is equal to or more than $1.5 \times 10^{-3}$ N·m², a lot of optical fiber cables 1 (thirty or more optical fiber cables 1) can be directly push-inserted into the electric conduit (see the experimental production (7) and the experimental production (8)).

Higher bending rigidity generally means good push-insertability. However, in a case where the optical fiber cable 1 is wound to have a small diameter and received in a cabinet, a closure or the like, if bending rigidity is too high, it is difficult to wind the optical fiber cable 1 to have a small diameter because the optical fiber cable is hard. This deteriorates workability. In light of workability, it is desirable that the bending rigidity is within a range of $1.5 \times 10^{-3}$ N·m² to $5.0 \times 10^{-3}$ N·m² (see the experimental production (7) and the experimental production (8)).

Next, a method for more efficiently carrying out push-insert using the optical fiber cable 1 having good push-insertability described above will be described.

Figure 3:
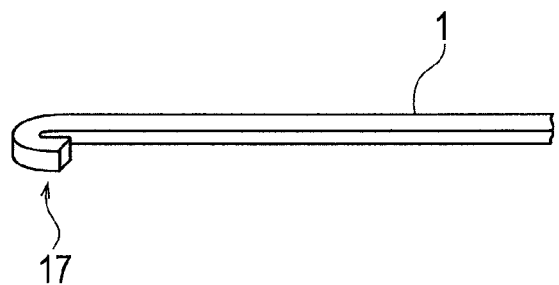
FIG. 3 It is a perspective diagram that illustrates a state where a distal end portion of the optical fiber cable illustrated in FIG. 2 is bent.

As shown in FIG. 3, when the push-insert is carried out, it is desirable to turn down a distal end of the optical fiber cable 1 at an angle of about 180 degrees by about 10 mm and process it to form a turndown portion 17.

Only cutting the distal end of optical fiber cable 1 using a cutoff tool such as a nipper causes a corner part of the cut surface to be caught by a cable having been already laid and/or an inner wall of an electric conduit at a curved portion of the electric conduit, which prevents desirable push-insertability from being obtained. Also, there is a possibility that burr of the tensile strength members 5 and 5 (steel wires) in the cut surface damages an outer jacket of cable having been already laid.

Figure 4:
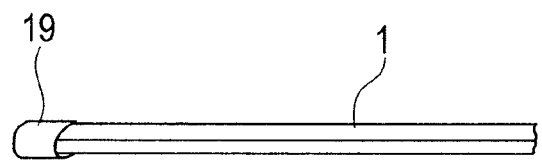
FIG. 4 It is a perspective diagram that illustrates a state where a cover is covered on the distal end portion of the optical fiber cable illustrated in FIG. 2.

As shown in FIG. 4, the distal end of optical fiber cable 1 is covered with a cover 19 formed in a cap shape, which prevents the distal end of optical fiber cable 1 from being caught by a cable having been already laid and/or an inner wall of an electric conduit at a curved portion of the electric conduit. However, in a case of drawing back the optical fiber cable 1 which is being push-inserted, there is a possibility that the cover 19 comes off the distal end of optical fiber cable 1 to be left in an electric conduit and the cover 19 can not be retrieved from the electric conduit. Further, there is a possibility that the cover 19 left in the electric conduit interferes in laying of a new optical fiber cable 1. Furthermore, there is a possibility that when the optical fiber cable 1 laid in an electric conduit is drawn from the electric conduit in order to maintain the optical fiber cable, the cover 19 of the optical fiber cable 1 damages an outer jacket of another cable in the electric conduit.

On the other hand, the method for forming the turndown portion 17 at the distal end portion of optical fiber cable 1 and inserting the optical fiber cable 1 has the following advantages: the turndown portion 17 can be easily formed at a site of work; the distal end of optical fiber cable 1 is not caught by a cable having been already laid and/or an inner wall of an electric conduit at a curved portion of the electric conduit; burr of the tensile strength members 5 and 5 (steel wires) in the cut surface of the distal end of optical fiber cable 1 does not damage an outer jacket of cable having been already laid; and a foreign object such as the cover 19 is not left in an electric conduit.

Next, a method for more efficiently laying a plurality of optical fiber cables 1 in an electric conduit will be described.

Figure 5:
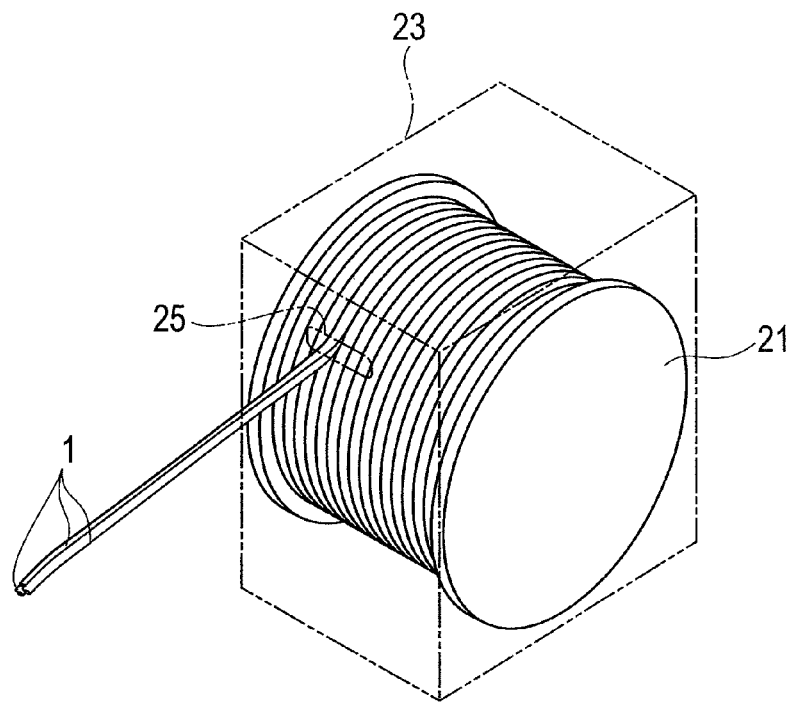
FIG. 5 It is a perspective diagram that illustrates a state where a plurality of optical fiber cables each illustrated in FIG. 2 is bundled and wound on a reel together.

As shown in FIG. 5, a plurality of optical fiber cables 1 each illustrated in FIG. 2 is bundled and wound on a reel 21 together, and they are received in a storage box 23 such as a cardboard box. The plurality of optical fiber cables 1 wound together is drawn from a drawing aperture 25 formed on the storage box 23. The outer jacket 7 of each optical fiber cable 1 is composed of a fire-retarding, high-hardness and low-frictional material having Shore D hardness equal to or more than 60. The tensile strength members 5 and 5 of each optical fiber cable 1 are composed of steel wires each having a diameter of 0.5 mm. Each optical fiber cable 1 has an outer diameter of about 1.6×2.0 mm and bending rigidity in the short side direction of $1.5 \times 10^{-3}$ N·m².

Figure 6:
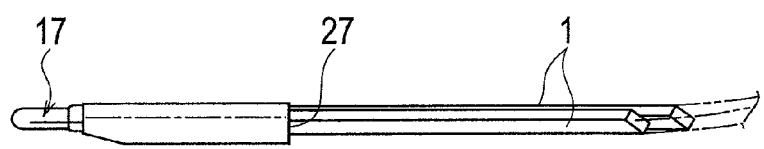
FIG. 6 It is a perspective diagram that illustrates a state where distal end portions of some optical fiber cables in the plurality of optical fiber cables are bent, and then the plurality of optical fiber cables is bundled.

As shown in FIG. 6, the plurality of optical fiber cables 1 wound together has distal end portions which are covered with a fixing tape 27 such as an adhesive tape and bundled. At a tip of the distal end portions ahead of the fixing tape 27, one or more optical fiber cables in the plurality of optical fiber cables 1 are turned down at an angle of about 180 degrees to form a turndown portion 17 (see FIG. 3). It is desirable that a diameter of turndown portion 17 is smaller than a diameter of the plurality of optical fiber cables covered with the fixing tape 27 and bounded. By push-inserting the plurality of optical fiber cable 1 in an electric conduit together, man-hour of inserting work can be reduced to remarkably increase work efficiency, in comparison with a case where the optical fiber cable 1 is push-inserted in the electric conduit one-by-one.

For example, in a case of repeating six times a work of push-inserting five optical fiber cables 1 bounded using the method described above to insert thirty optical fiber cables 1 in the electric conduit of the pipe model, it takes about thirty minutes to complete the work. In contrast, in a case of repeating thirty times a work of push-inserting the optical fiber cable 1 in the electric conduit of the pipe model one-by-one, it takes about ninety minutes to complete the work.

The optical fiber cable 1 has the following technical advantages.

(1) The optical fiber cable 1 includes the outer jacket 7 (fire-retarding, high-hardness and low-frictional outer jacket) having Shore D hardness equal to or more than 60 and a friction coefficient equal to or less than 0.2, which allows the optical fiber cable 1 to be inserted in an electric conduit having curved portions without using a lubricant agent for insert. This increases insertability into an electric conduit. Also, in a case where a plurality of optical fiber cables 1 is inserted and laid in an electric conduit where a cable has been already laid, the optical fiber cable 1, which includes the outer jacket 7 (fire-retarding, high-hardness and low-frictional outer jacket) having Shore D hardness equal to or more than 60 and a friction coefficient equal to or less than 0.2, can surely reduce a possibility that the optical fiber cable 1 being inserted provides roll or scuff on the optical fiber cable 1 having been already laid.

(2) The optical fiber cable 1 has the bending rigidity in the short side direction being equal to or more than $1.3 \times 10^{-3} \text{N} \cdot \text{m}^2$, which allows the optical fiber cable 1 to be inserted in an electric conduit by the push-insert method without using an insert tool such as an insert rod. This reduces man-hour of insert work.

(3) The optical fiber cable 1 has the bending rigidity in the short side direction being within a range of $1.3 \times 10^{-3} \text{N} \cdot \text{m}^2$ to $5.0 \times 10^{-3} \text{N} \cdot \text{m}^2$ which further increases push-insertability and increases workability at a time when the optical fiber cable 1 is received in a cabinet, a closure or the like.

(4) The optical fiber cable 1 can be directly pushed in an electric conduit to be insert in the electric conduit, which increases the efficiency of insert work because it is not necessary to push-insert the optical fiber cable 1 using an insert rod.

(5) A plurality of optical fiber cables 1 is bundled and wound on the reel 21 together and the plurality of optical fiber cable 1 wound together is simultaneously inserted in an electric conduit, which remarkably reduces working hours in comparison with a case of inserting the optical fiber cable 1 in the electric conduit one-by-one.

REFERENCE SIGNS LIST

1 optical fiber cable
3 optical fiber
5 tensile strength member
7 outer jacket
9 X-axis
11 Y-axis
13 notch
15 optical element portion
17 turndown portion
19 cover
21 reel
23 storage box
25 drawing aperture
27 fixing tape

The invention claimed is:

1. An optical fiber cable comprising:
an elongated optical element portion comprising:
an optical fiber including one or more plastic coated optical fibers, tight-buffered optical fibers or optical ribbon fibers;
at least a pair of tensile strength members arranged in parallel at both sides of the optical fiber in a width direction of the optical fiber; and
an outer jacket covering outer circumferences of the optical fiber and the pair of tensile strength members, and having a rectangular cross-sectional surface in which a long side is arranged in the width direction of the optical fiber and a short side is arranged in a thickness direction perpendicular to the width direction of the optical fiber,
wherein a frictional coefficient of the outer jacket is equal to or less than 0.20 and Shore D hardness of the outer jacket is equal to or more than 60, and
a bending rigidity in the short side direction of the outer jacket is within a range of $1.5 \times 10^{-3} \text{N} \cdot \text{m}^2$ to $5.0 \times 10^{-3} \text{N} \cdot \text{m}^2$.

2. A laying method of optical fiber cable comprising:
push-inserting an optical fiber cable into an electric conduit,
wherein the optical fiber cable includes an elongated optical element portion, the elongated optical element portion includes:
an optical fiber including one or more plastic coated optical fibers, tight-buffered optical fibers or optical ribbon fibers;
at least a pair of tensile strength members arranged in parallel at both sides of the optical fiber in a width direction of the optical fiber; and
an outer jacket covering outer circumferences of the optical fiber and the pair of tensile strength members, and having a rectangular cross-sectional surface in which a long side is arranged in the width direction of the optical fiber and a short side is arranged in a thickness direction perpendicular to the width direction of the optical fiber,
a frictional coefficient of the outer jacket is equal to or less than 0.20, and
Shore D hardness of the outer jacket is equal to or more than 60, and
a bending rigidity in the short side direction of the outer jacket of the optical fiber cable is within a range of $1.5 \times 10^{-3} \text{N} \cdot \text{m}^2$ to $5.0 \times 10^{-3} \text{N} \cdot \text{m}^2$.

3. The laying method of optical fiber cable according to claim 2, further comprising inserting the optical fiber cable into the electric conduit in a state where a distal end portion of the optical fiber cable is bent.

4. The laying method of optical fiber cable according to claim 3, further comprising bundling the optical fiber cable of which the distal end portion is bent and another optical fiber cable using a fixing member, and
inserting at least two optical fiber cables into the electric conduit.

5. The laying method of optical fiber cable according to claim 4, further comprising winding a plurality of optical fiber cables on a reel together previously, and inserting the plurality of optical fiber cables into the electric conduit at one time.

6. The laying method of optical fiber cable according to claim 2, further comprising winding a plurality of optical fiber cables on a reel together previously, and inserting the plurality of optical fiber cables into the electric conduit at one time.

* * * * *